United States Patent
Vajravel et al.

(10) Patent No.: US 10,462,228 B2
(45) Date of Patent: Oct. 29, 2019

(54) PROVIDING ACCESS TO A SMARTCARD WITHIN A REMOTE SESSION

(71) Applicant: Wyse Technology L.L.C, Santa Clara, CA (US)

(72) Inventors: Gokul Thiruchengode Vajravel, Bangalore (IN); Ramanujam Kaniyar Venkatesh, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 278 days.

(21) Appl. No.: 15/298,882

(22) Filed: Oct. 20, 2016

(65) Prior Publication Data

US 2018/0115613 A1 Apr. 26, 2018

(51) Int. Cl.
*H04L 29/08* (2006.01)

(52) U.S. Cl.
CPC .................... *H04L 67/141* (2013.01)

(58) Field of Classification Search
CPC ............... H04L 67/141; H04L 63/0853; G06F 9/45533
See application file for complete search history.

(56) References Cited

U.S. PATENT DOCUMENTS

| | | | |
|---|---|---|---|
| 10,050,957 B1* | 8/2018 | Farrugia | H04L 63/0853 |
| 2011/0307544 A1* | 12/2011 | Lotlikar | G06F 9/468 |
| | | | 709/203 |
| 2014/0331297 A1* | 11/2014 | Innes | H04L 63/08 |
| | | | 726/7 |
| 2016/0094543 A1* | 3/2016 | Innes | H04L 63/0823 |
| | | | 726/6 |
| 2016/0094546 A1* | 3/2016 | Innes | H04L 63/0823 |
| | | | 713/156 |
| 2017/0041398 A1* | 2/2017 | Kumar | H04L 67/14 |
| 2017/0318112 A1* | 11/2017 | Johnsimon | H04L 67/2814 |

OTHER PUBLICATIONS

"International Standard ISO/IEC 7816-3—Identification cards—Integrated circuit cards—Part 3: Cards with contacts—Electrical interface and transmission protocols", 2006. (Year: 2006).*
"Function memcpy", Captured from http://www.cplusplus.com/reference/cstring/memcpy/ on Jan. 11, 2015. (Year: 2015).*

* cited by examiner

*Primary Examiner* — Hamza N Algibhah
*Assistant Examiner* — James Ross Hollister
(74) *Attorney, Agent, or Firm* — Kirton McConkie; Brian Tucker

(57) ABSTRACT

Access to a redirected smart card can be provided to applications executing within a remote session. To enable this access, a smart card stub can be executed within the remote session and can function to intercept an application's API calls to access a smart card. A corresponding smart card proxy can also be executed within session 0 and can function to receive the intercepted API calls from the smart card stub. The smart card proxy can then execute the API calls. Because the smart card proxy is executing in session 0, the smart card resource manager service will not block access.

20 Claims, 10 Drawing Sheets

PROVIDING ACCESS TO A SMARTCARD WITHIN A REMOTE SESSION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOB-AL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Smart card readers are a type of USB device that can be redirected in much the same manner as described above. However, due to security concerns, the Windows operating system places limits on how an application can access a smart card that has been inserted into a smart card reader. In particular, the Windows operating system does not allow an application executing within a remote session to access a smart card unless the smart card is mapped from the remote session. Using the above described redirection techniques, a redirected smart card will appear as if it was locally connected, and therefore it will not be accessible within the remote session.

FIG. 3A provides an example of how Windows applies these limits using the same general architecture of server 104 as described above. In this example, a smart card 340 is connected directly to server 104 (i.e., not over a remote session). For ease of illustration, smart card 340 can generally represent a smart card reader alone or a smart card reader and a smart card that has been inserted into the reader.

As is typical, operating system 170 will cause appropriate drivers to be loaded for smart card 340 as represented by smart card driver stack 380. An application 370 can therefore access smart card 340 via the appropriate interfaces of operating system 170. In the Windows operating system, an application can access a smart card via a cryptographic service provider (or CSP) and the WinSCard API. This CSP may be a vendor-specific CSP or a Windows-provided CSP (Basecsp.dll) which works in tandem with a vendor-provided smart card mini-driver. CSP 170a is intended to represent either of these scenarios.

Via CSP 170a and WinSCard API 170b, application 370 can invoke functionality of the Smart Card Resource Manager service (or simply "resource manager") 170c. Resource manager 170c then interfaces with the smart card driver(s) for any smart card connected to server 104 whether physically or virtually.

Resource manager 170c is the component of the Windows operating system that is configured to block access to a smart card from any application that is running in a remote session thus making a redirected smart card inaccessible within a remote session. The exact manner in which resource manager 170c blocks access is beyond the scope of this discussion. Suffice it to say that the Windows smart card subsystem will only list mapped smart cards to applications executing within a remote session such that the smart cards, including redirected smart cards, will not be visible to such applications. For example, FIG. 3B illustrates a scenario where smart card 340 is connected to client 102 and redirected to server 104 via a remote session such that virtual smart card 390 appears on server 104. To resource manager 170c, smart card 390 will appear as a locally connected device.

In this scenario, the user may run application 370 for the purpose of accessing smart card 340. However, because application 370 is executing within a remote session, resource manager 170c will block access to smart card 340 (since it believes smart card 370 is locally connected). In short, Windows is configured to prevent a smart card from being accessed within a remote session whether or not the smart card is locally connected or redirected over a remote session.

To enable a smart card to be accessed within a remote session, driver mapping techniques have been created. FIG. 3C generally illustrates how this driver mapping can be implemented. To enable smart card access within a remote session, a driver mapping component 385 can be executed on server 104 and smart card driver stack 380 can be installed on client 102. Driver mapping component 385 can generally represent any of the possible ways in which a driver can be mapped as is known in the art. For simplicity, it can be assumed that driver mapping component 385 intercepts smart card API calls that are directed towards smart card driver stack 380 installed on server 104 and routes these API calls to proxy 210 (or another component) via RPC. In essence, this bypasses the mechanisms in the Windows Smart Card Subsystem (i.e., resource manager 170c) that would otherwise block the API calls due to application 370 being executed within a remote session. Proxy 210 can then invoke these API calls. Responses from smart card 340 can be returned in a similar manner.

Although this driver mapping technique works, it is not desirable or possible in many situations. For example, client 102 may not be compatible with the smart card driver(s) that will need to be loaded into smart card driver stack 380 in order to handle some or all of the mapped API calls. Specifically, a Linux operating system is employed on many thin clients and Windows-based smart card drivers are incompatible with Linux. Additionally, very few smart card providers have developed drivers that can be employed for driver mapping on non-Windows clients.

Further, to accommodate mismatches between the versions of the client operating system and the server operating system, current driver mapping solutions do not map all smart card APIs. For example, many smart card APIs that are available in Windows Server 2016 or Windows 10 (e.g., the SCardGetReaderDeviceInstanceId function) are not mapped and will therefore fail if invoked inside a remote session.

Finally, installing the smart card drivers on the client prevents the client from being "lightweight." For example, many entities create computing environments in which their employees use thin or zero clients. It is oftentimes desirable to minimize the components on these clients to reduce cost. Requiring the installation of the smart card drivers in turn increases the hardware requirements for the client as well as requires additional management.

BRIEF SUMMARY

The present invention extends to methods, systems, and computer program products for enabling a redirected smart card to be accessed within a remote session. This can be accomplished without implementing driver mapping such that the smart card drivers do not need to be installed on the client. This also allows the full set of APIs to be available when the smart card is redirected.

To enable access to a smart card within a remote session, a smart card stub can be executed within the remote session and can function to intercept an application's API calls to access a smart card. A corresponding smart card proxy can also be executed within session 0 and can function to receive the intercepted API calls from the smart card stub. The smart card proxy can then execute the API calls. Because the smart card proxy is executing in session 0, the smart card resource manager service will not block access. When the smart card proxy receives a response, it can pass the response back to the smart card stub which in turn will return it to the calling application.

This same technique can be employed to enable a smart card to be accessed from a nested session even without redirecting the smart card to the nested session. In this nested session scenario, the smart card stub can be executed within the nested session and can be configured to pass intercepted API calls to the smart card proxy that is executing within session 0 on the client-side of the nested session. The smart card proxy can then handle the API call in the same manner as when the API call is received from a smart card stub executing on the same system.

In some embodiments, the smart card stub can be configured to perform a variable ATR buffering technique to eliminate the need to parse an ATR string to identify its length prior to passing an intercepted API call to the smart card proxy. The variable ATR buffering technique can include copying the ATR string into a fixed-length buffer regardless of the size of the ATR string. In this way, the smart card stub will always be able to specify the same length for the ATR string when passing an API call to the smart card proxy.

In one embodiment, the present invention is implemented as a method, performed by a server in a virtual desktop infrastructure, for enabling smart card access from within a remote session. A remote session can be established between a client and the server. Establishing the remote session can include redirecting a smart card that is connected to the client to the server. A smart card stub that executes within the remote session can intercept an API call for accessing the redirected smart card that was made by an application executing with the remote session. The smart card stub can pass the intercepted API call to a smart card proxy that is executing on the server within session 0. The smart card proxy can execute the API call to access the redirected smart card.

In another embodiment, the present invention is implemented as a method, performed by a server in a virtual desktop infrastructure, for enabling smart card access from within a remote session. As part of establishing a remote session for a client that has remotely connected to the server, a smart card stub can be loaded in the remote session and a smart card proxy can be loaded in session 0. Loading the smart card stub can include hooking operating-system-provided API calls for accessing smart cards. The smart card stub can intercept an API call for accessing the redirected smart card that was made by an application executing with the remote session. The smart card stub can pass the API call to the smart card proxy using a remote procedure call. The smart card proxy can then execute the API call to access the redirected smart card.

In another embodiment, the present invention is implemented as a virtual desktop infrastructure environment that includes: an agent that executes on a server and is configured to establish remote sessions with clients; a virtual USB bus driver that interfaces with the agent to redirect smart cards from the clients to the server; a smart card stub that is loaded in each remote session and is configured to intercept API calls to access the redirected smart cards; and a smart card proxy that is loaded in session 0 and is configured to receive the intercepted API calls from the smart card stub and to invoke the API calls This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 4:
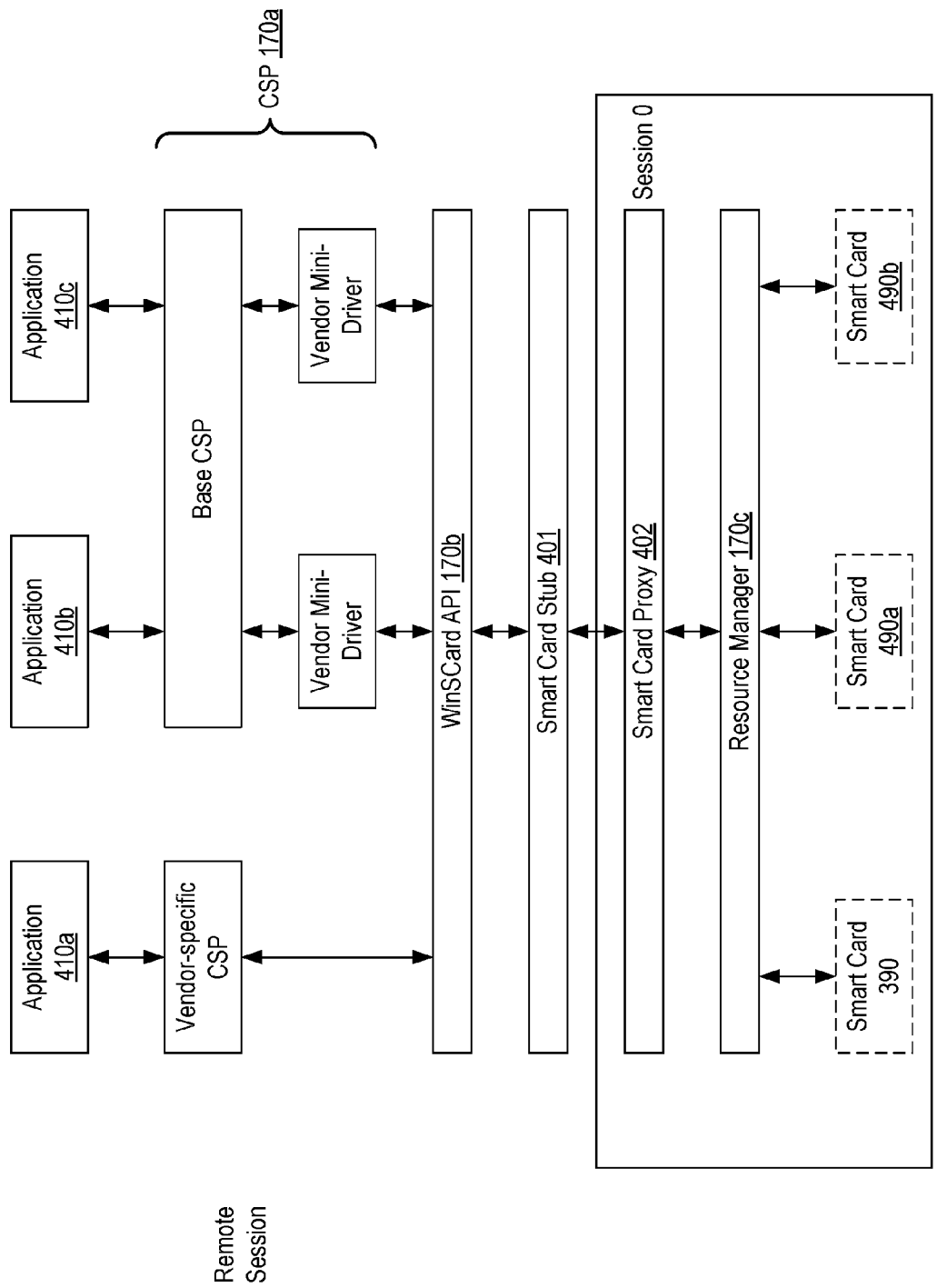
FIG. 4 illustrates the server side architecture that can be employed to implement embodiments of the present invention.

FIG. 4 illustrates an example of the server-side architecture that can be employed to implement embodiments of the present invention. As shown, this server-side architecture includes each of the components of the Windows Smart Card Subsystem as addressed above, namely, CSP 170*a*, WinSCard API 170*b*, and resource manager 170*c*. A number of applications 410*a*-410*c* are shown as employing either the Windows-provided base CSP or a vendor-specific CSP to interface with WinSCard API 170*b*. As described above, WinSCard API 170*b* provides the functions for communicating smart card access requests to resource manager 170*c* which will then pass the requests to the appropriate driver stack for the targeted smart card. FIG. 4 represents that various smart cards are connected to server 104 including smart cards 390, 490*a*, and 490*b*. Smart cards 490*a* and 490*b* could represent smart cards that are either redirected or directly connected to server 104. Even though the typical scenario would involve redirecting a smart card over a remote session and then accessing the smart card from within that same remote session, the techniques of the present invention could equally be employed to access a smart card that is directly connected to server 104 from within a remote session or to access a smart card that is redirected over a remote session from within a different remote session.

FIG. 4 shows that resource manager 170*c* is a trusted service that executes in session 0. As described in the background, resource manager 170*c* is configured to prevent applications 410*a*-410*c* from accessing a smart card if these applications are executing within a remote session. Therefore, if a user establishes a remote session with server 104 and executes any of applications 410*a*-410*c* within the remote session for the purpose of accessing a redirected smart card, resource manager 170*c* will block the access.

To address this issue, the present invention employs a smart card stub 401 and a smart card proxy 402 in order to, in essence, cause resource manager 170*c* to believe that applications 410*a*-410*c* are executing within session 0 rather than within a remote session. Smart card stub 401 comprises an executable component that is configured to intercept smart card API calls. For example, smart card stub 401 could be a DLL that hooks itself to each API call in WinSCard API 170b that can be employed to direct a request to a smart card. These API calls can include the SCardConnect function, the SCardBeginTransaction function, the SCardTransmit function, and the SCardGetReaderDeviceInstanceId function to name just a few. Accordingly, whenever any of the hooked functions are called, smart card stub 401 will be invoked to handle the call.

For any API call that it intercepts, smart card stub 401 can redirect the API call to smart card proxy 402. For example, smart card stub 401 and smart card proxy 402 can communicate via remote procedure calls (RPC). In particular, whenever smart card stub 401 intercepts a smart card API call, it can employ an RPC routine to cause smart card proxy 402 to execute the intercepted call. Therefore, from the perspective of resource manager 170c, the call will be viewed as having been made by smart card proxy 402 rather than one of applications 410a-410c. Because smart card proxy 402 executes in session 0, resource manager 170c will not block the call but will instead direct it to the appropriate smart card. Once the call returns, smart card proxy 402 will use RPC techniques to return the response to smart card stub 401 and then onto the calling application.

Figure 5:
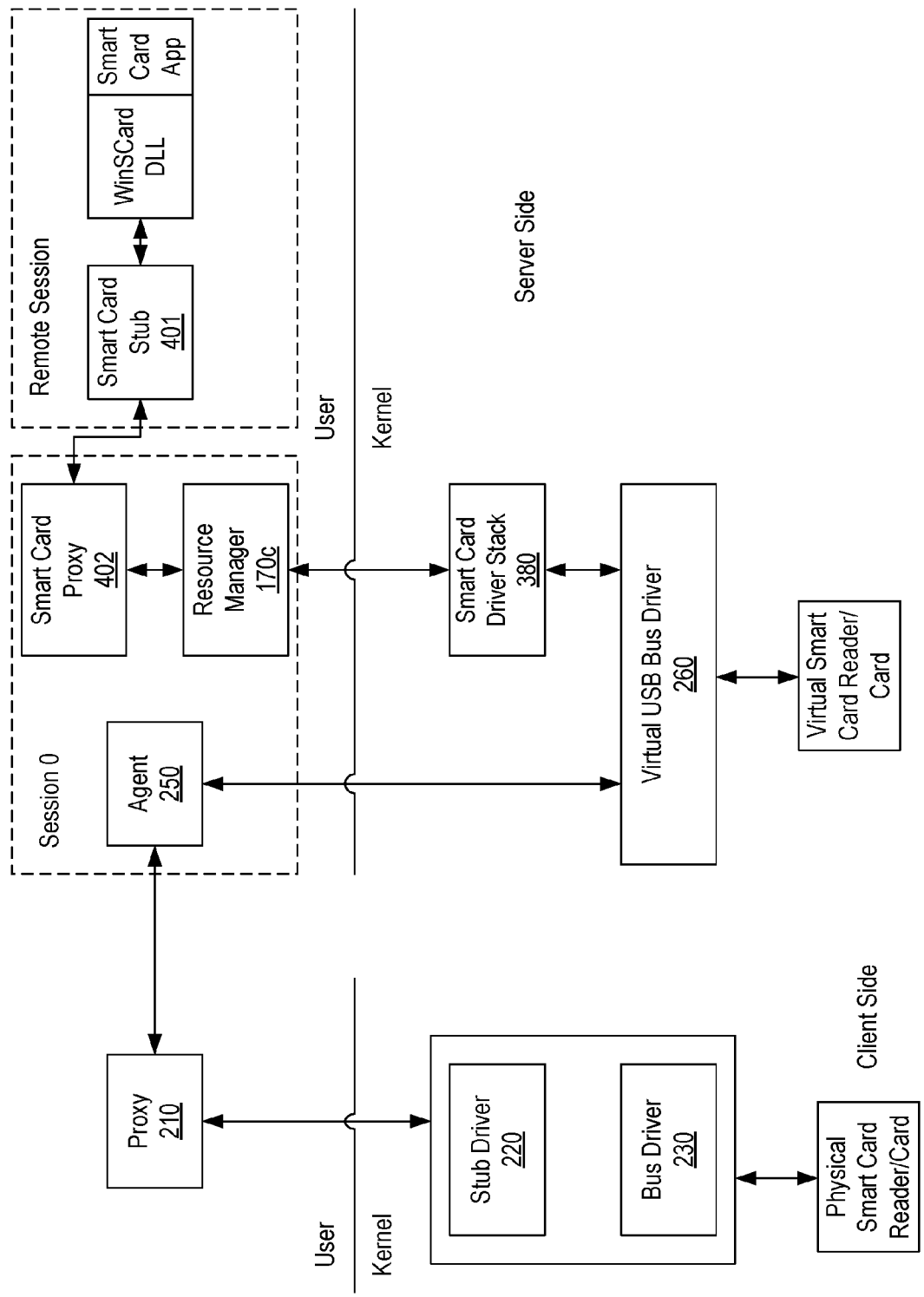
FIG. 5 illustrates the client/server architecture that can be employed to implement embodiments of the present invention.

FIG. 5 represents the client/server architecture that can be employed to enable a redirected smart card to be accessed from within a remote session. As was described in the background, when a smart card is connected to a client that has established a remote session with a server, the virtual desktop infrastructure can redirect the smart card to the server to cause the smart card to appear as if it were physically connected to the server. In this scenario, the server will create a remote (or user) session in which any applications accessed by the client will be executed.

FIG. 5 illustrates that a smart card application has been invoked by the client and is therefore running in a remote session. The smart card application is configured to use a CSP and the WinSCard DLL for purposes of making smart card API calls. In accordance with the techniques of the present invention, smart card stub 401 can also be loaded in the remote session in a manner that allows it to intercept the smart card application's smart card API calls.

When smart card stub 401 intercepts a smart card API call, it will use RPC to pass the API call to smart card proxy 402 which is executing in session 0. Smart card proxy 402 will then invoke the API call causing resource manager 170c to believe that the call has originated within session 0. Resource manager 170c will perform its processing to cause the proper communications to be delivered to smart card driver stack 380 (e.g., causing suitable IRPs/URBs to be routed down to smart card driver stack 380). After passing through smart card driver stack 380, virtual USB bus driver 260 will receive the communications and can route them to proxy 210 via agent 250. Proxy 210 can then deliver the communications to the smart card reader and/or smart card connected to the client. Any response generated by the smart card reader and/or smart card will then be routed back in a reverse manner.

In this way, any application that is executed in a remote session will be able to access a smart card including a smart card that is redirected from the client that established the remote session. A user will therefore be able to change a password or certificate of a smart card (or perform any other provided function) from a remote session without needing to employ driver mapping techniques.

The technique of employing a stub in the remote session and a proxy in session 0 enables this access without requiring any specific drivers to be loaded on the client. For example, as shown in FIG. 5, smart card driver stack 380 does not need to be loaded on the client to enable access to the redirected smart card from within the remote session. Accordingly, a thin client can remain lightweight even while allowing access to a redirected smart card. Also, because the Windows drivers do not need to be loaded on the client, the present invention can be implemented regardless of the client's operating system.

This technique also provides the advantage of being agnostic to the remoting protocol used to establish the remote session. For example, proxy 210 and agent 250 could employ RDP, ICA or any other remoting protocol to communicate without needing to alter the technique for the particular remoting protocol. The technique is also transparent to the calling applications. In particular, because smart card stub 401 intercepts calls to the standard WinSCard functions, applications can call those functions (including the latest non-mapped functions) without knowledge of the underlying technique.

In some embodiments of the present invention, the above described technique can be employed to allow a redirected smart card to be accessed from within a nested session. A nested session is a remote session that is established within a remote session. For example, a user of a client may establish a first remote session with a first server and may then establish a second remote session with a second server from within the first remote session. With reference to FIG. 5, a nested session could be created by executing VDI software within the remote session to establish a remote desktop or remote application connection with another server.

Figure 6:
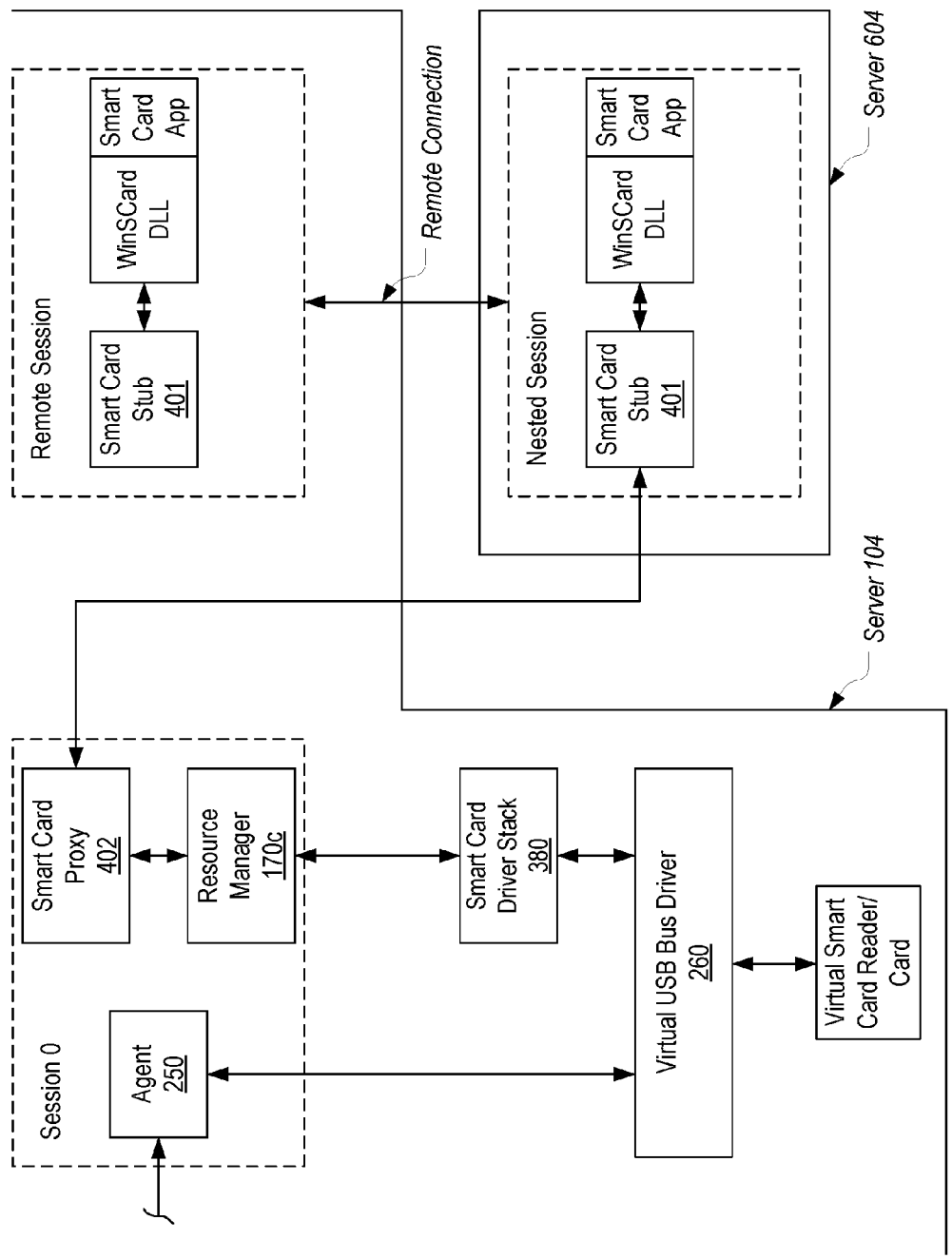
FIG. 6 illustrates how the present invention can enable access to a smart card from within a nested session.

FIG. 6 is based on FIG. 5 and illustrates an example scenario in which the user of the client creates a nested session. For ease of illustration, the client to which the smart card reader and card are connected, is not shown in FIG. 6. However, in these nested session embodiments, agent 250 would communicate with proxy 210 in the same manner as described above including to cause the smart card reader and card to be redirected to server 104.

As indicated, the user has interacted with appropriate components in the remote session on server 104 to cause a remote session to be created on server 604. Because this remote session on server 604 is created from the remote session on server 104, it is a nested session. Although not shown, server 604 would also include a session 0 within which resource manager 170c would execute for the purpose of managing access to smart cards connected to server 604.

In this situation, the same techniques described above can be employed to allow an application executing within the nested session to access the smart card reader and/or card that are physically connected to the client. Additionally, this access can be enabled from within the nested session without redirecting the smart card to server 604. Specifically, smart card stub 401 can be loaded in the nested session and can function in the same manner as described above to intercept API calls made by a smart card application executing within the nested session.

In the same manner as described above, smart card stub 401 executing within the nested session can employ RPC to cause smart card proxy 402 executing within session 0 on server 104 to invoke the call. Smart card proxy 402 can then return the response to smart card proxy 401 in the nested session. Due to the use of RPC, the smart card does not need to be redirected to server 604. In particular, because the API calls will be passed to smart card proxy 402 on server 104, smart card driver stack 380 on server 104 can be employed to handle the calls.

To enable the smart card stub within the nested session to pass API calls to the smart card proxy, the VDI infrastructure can be configured to identify when a remote session is a nested session. For example, although not shown, server 104 would include a proxy and server 604 would include an agent. As part of establishing a nested remote session, the proxy on server 104 can inform the agent on server 604 that the remote session is a nested session and can provide the information necessary for communicating with smart card proxy 402 via RPC (e.g., connection information for routing the RPC communications over a network and information identifying the availability of any smart card on server 104). Then, as part of launching the smart card stub within the nested session, the agent can provide this information to the smart card stub to allow the smart card stub to generate appropriate RPC communications when it subsequently intercepts smart card API calls.

Many smart cards are configured to output an Answer To Reset (ATR) following an electrical reset of the card's chip by a card reader. This ATR conveys information about the communication parameters proposed by the card and the card's nature and state. The PC/SC specification (which governs smart card integration in computing environments) requires that smart cards be identifiable using attributes such as the ATR and device name. Therefore, the ATR is unique for each smart card. However, the ATR of a smart card is not constant. An application must know a card's ATR in order to communicate with it.

Figure 1:
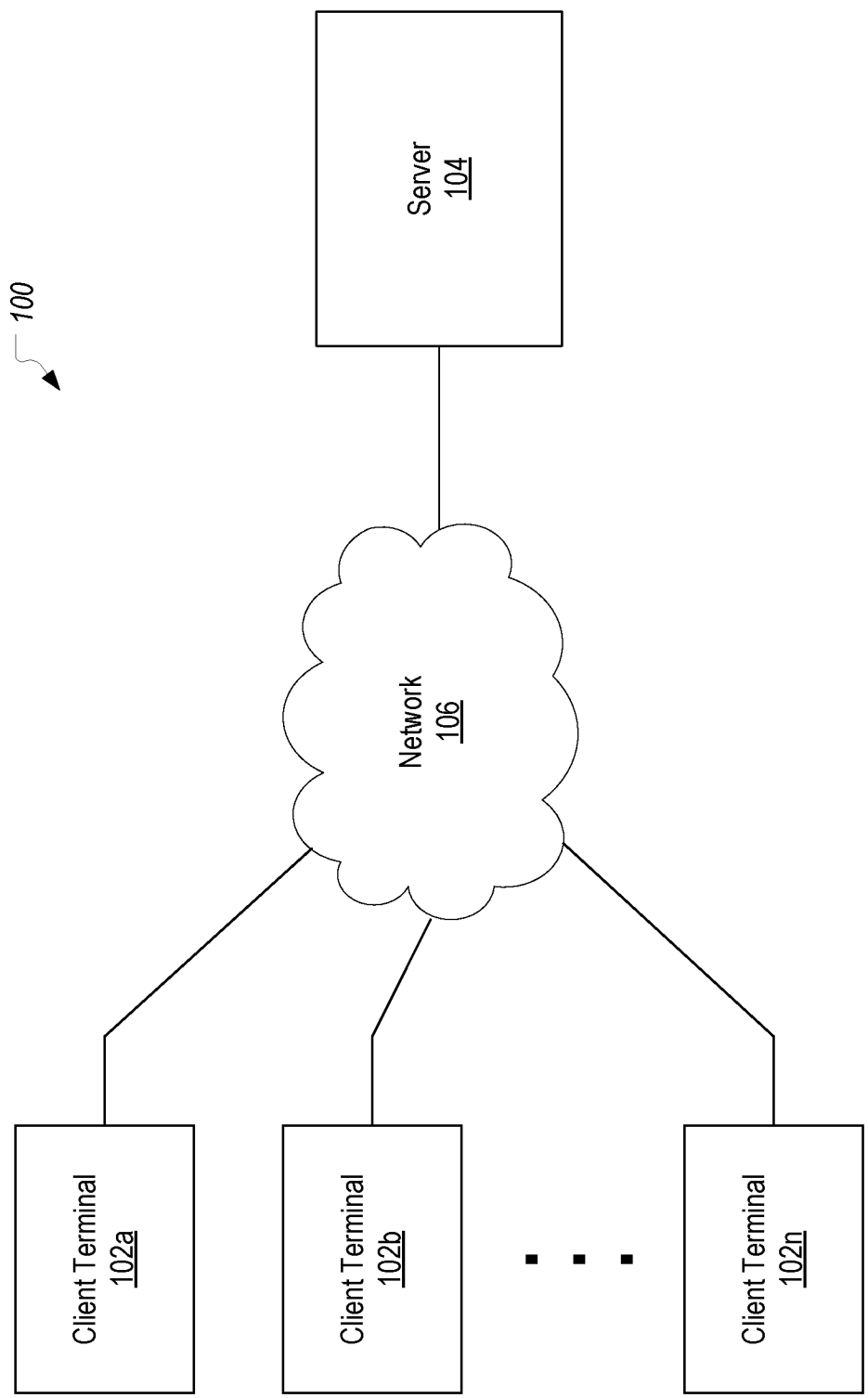
FIG. 1 illustrates an example computing environment in which the present invention can be implemented.
Figure 2:
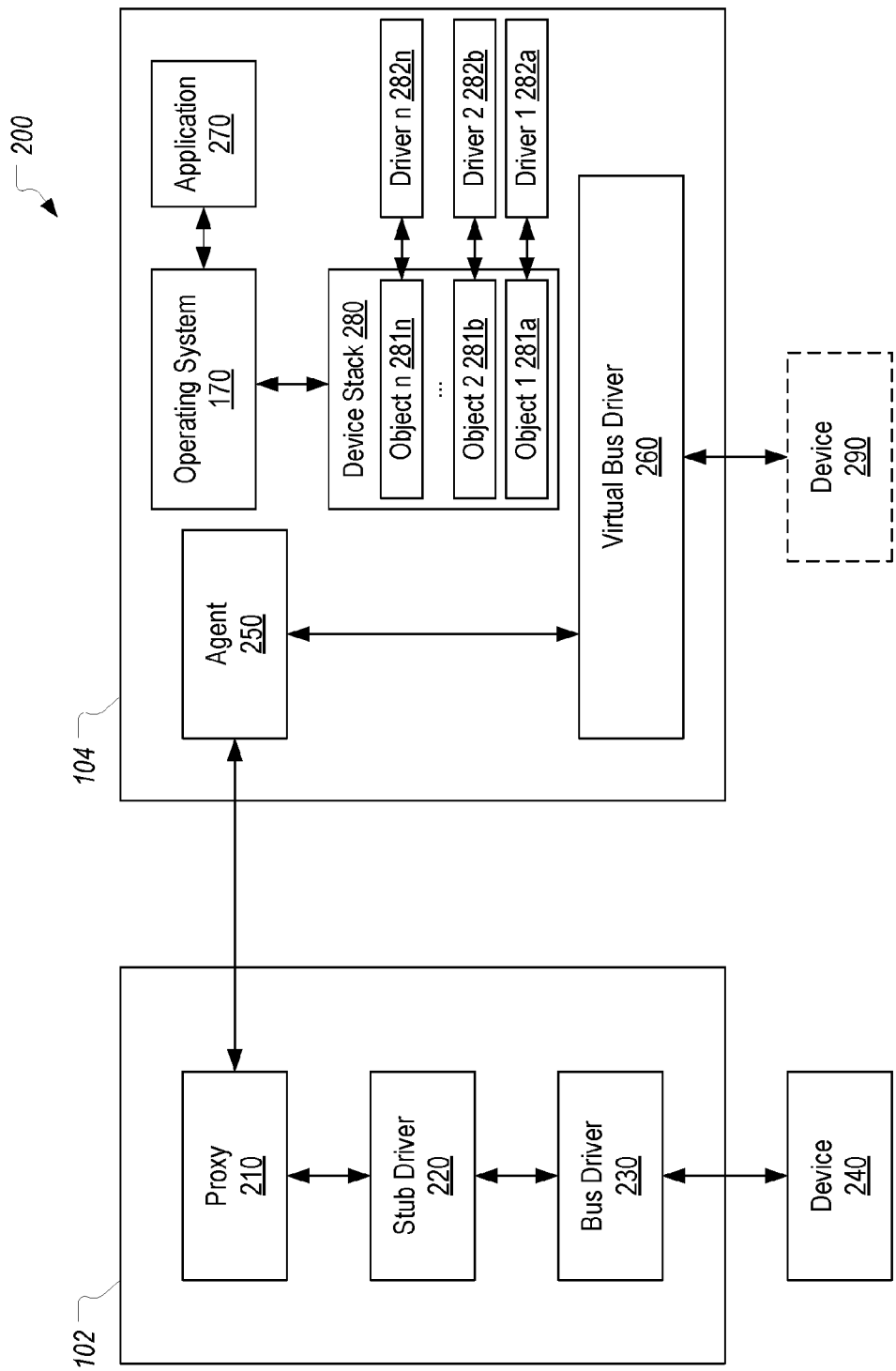
FIG. 2 illustrates how a USB device can be redirected from a client terminal to a server.
Figure 3A:
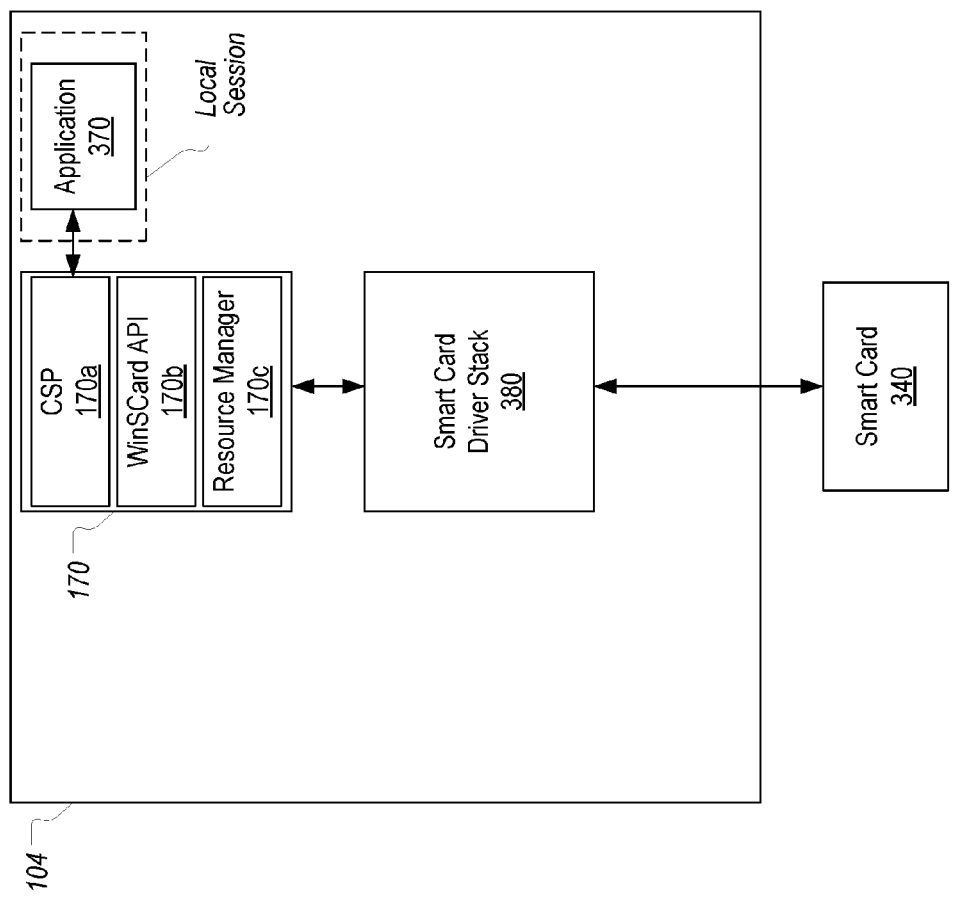
FIG. 3A illustrates how the Windows operating system provides access to a locally connected smart card.
Figure 3B:
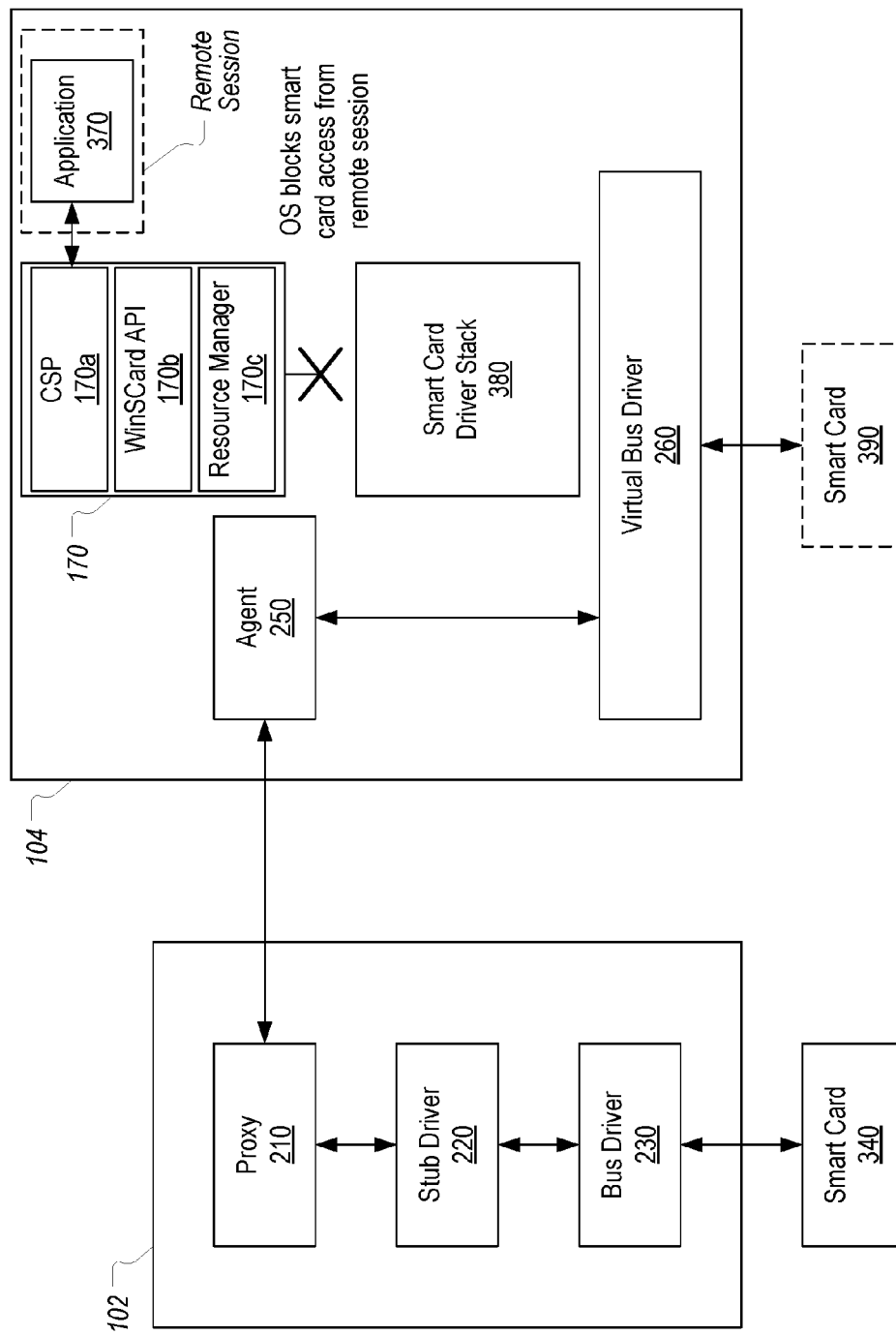
FIG. 3B illustrates how the Windows operating system prevents a smart card from being accessed by an application running in a remote session.
Figure 3C:
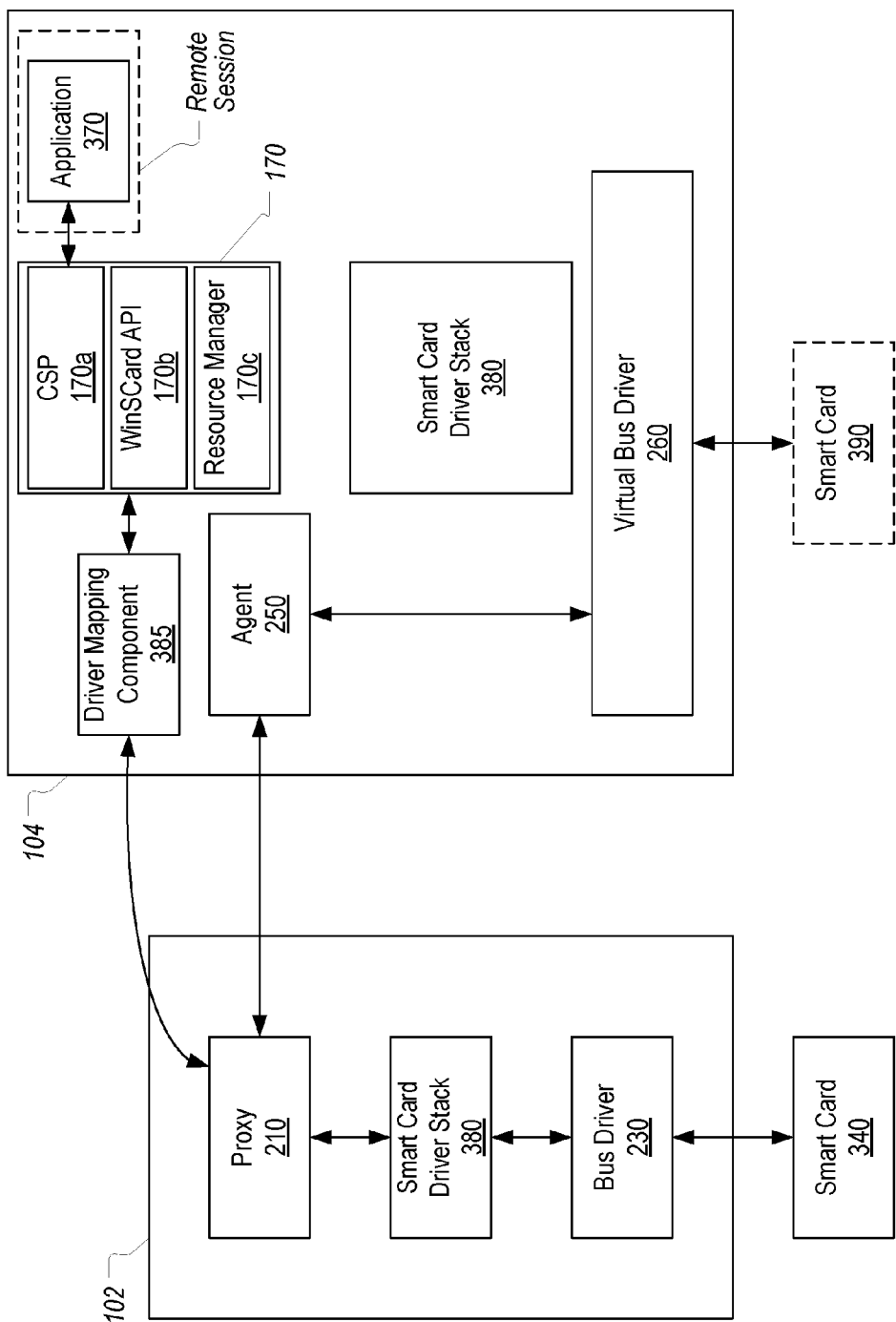
FIG. 3C illustrates how the Windows operating system performs driver mapping to enable a redirected smart card to be accessed from within a remote session.

Various API calls exist that allow an application to search a smart card database using an ATR string. These API calls can receive an ATR string as input and can return a list of smart cards that match the ATR string. As is known in the art, to make an RPC to pass these API calls, it is required to identify the length of the ATR string. Microsoft has currently created a solution for parsing an ATR string to identify its length (e.g., for use in the driver mapping architecture shown in FIG. 3C). However, this solution is dependent on current specifications (or more specifically, on the current ATR string format) and therefore must be updated whenever the specifications change. For this reason, Microsoft does not support mapping of API calls that require ATR parsing. For example, the SCardListCards function is not redirected when called from a remote session. In contrast, this function will generate results from the remote computer (e.g., server 104) rather than from the local computer (e.g., client 102). The results of calling SCardListCards from within a remote session will therefore not include a redirected smart card.

Because smart card stub 401 employs RPC to route these API calls to smart card proxy 402, it is also necessary that smart card stub 401 identify the length of the ATR string. In accordance with embodiments of the present invention, smart card stub 401 can be configured to implement a variable ATR buffering technique that does not require parsing the ATR string and will therefore enable applications executing in a remote session to access and list redirected smart cards.

API calls that employ an ATR string as input require that the address of the ATR string be passed as input. For example, the pbAtr input parameter of the SCardListCards function receives the address where the ATR string is stored. In order to pass this function via RPC, it is necessary to specify the length of the ATR string as part of the RPC. As mentioned above, the prior art driver mapping techniques employ a parsing algorithm to identity this length. The parsing algorithm will likely need to be updated any time the specifications change due to new/different formatting of the ATR string.

Figure 7:
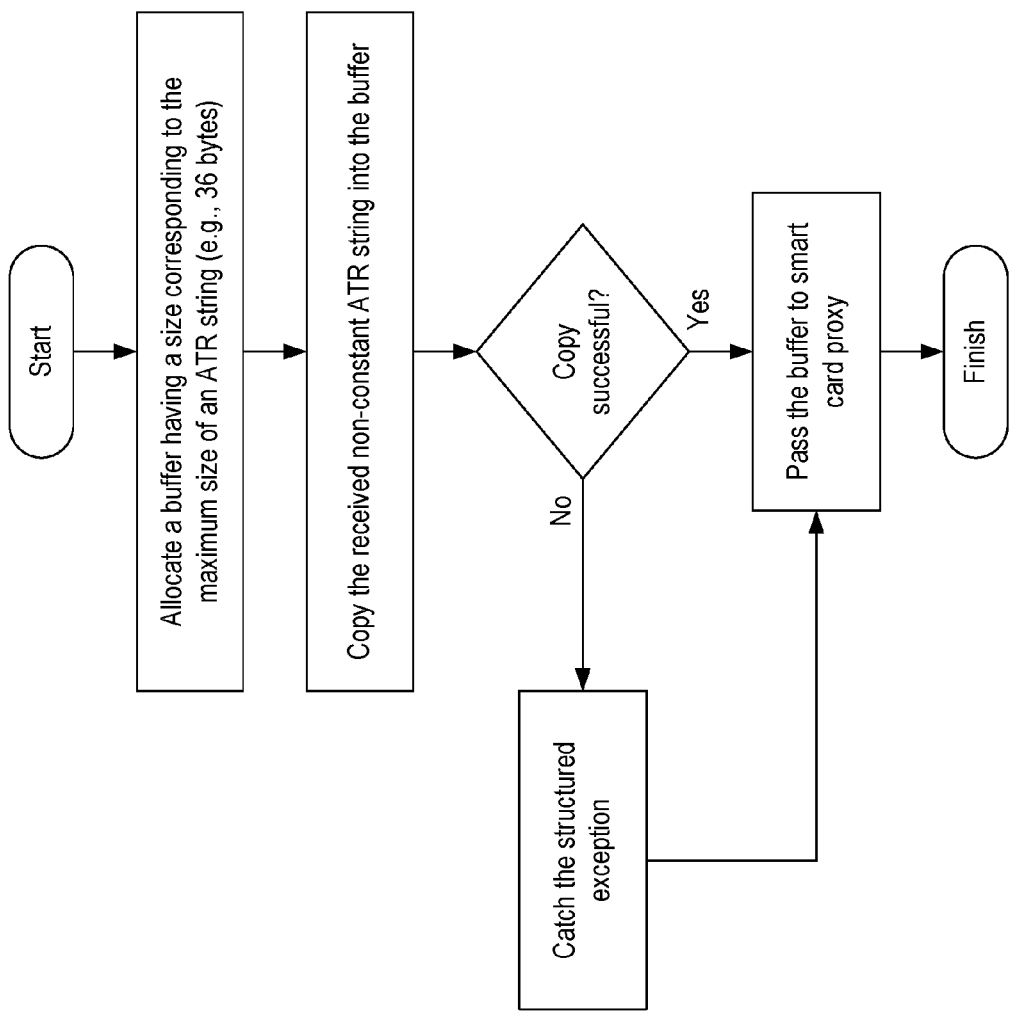
FIG. 7 illustrates a variable ATR buffering process.

To eliminate this need to parse the ATR string, smart card stub 401 can perform the variable ATR buffering technique that is illustrated in FIG. 7. This variable ATR buffering process can typically be performed after an ATR string has been received from a smart card (e.g., in response to the smart card being reset) such that the ATR string can be used as an input when an application calls a smart card API function.

This process commences in response to smart card stub 401 intercepting an API call that includes an ATR string. As indicated above, smart card stub 401 will need to specify the length of the ATR string in order to employ an RPC. Rather than parsing the ATR string to identify the actual length, smart card stub 401 can allocate a buffer having a size corresponding to the maximum size of an ATR string. Currently the governing specifications define this maximum size as 36 bytes. This buffer will therefore be large enough to store any valid ATR string.

Once the buffer is allocated, smart card stub 401 can copy the ATR string from the intercepted API call into the buffer (e.g., using the memcpy function). This copy will succeed only if the ATR string is the same size as the buffer, i.e., only if the ATR string has the maximum size. In particular, the memcpy function requires identifying the number of bytes to copy from a source address to a destination address. Smart card stub 401 can specify the maximum ATR string size as the number of bytes to copy. Therefore, if the ATR string is the maximum size, the memcpy function will succeed. However, if the ATR string is less than the maximum size, the memcpy function will attempt to copy bytes beyond the ATR string boundary thereby raising a structured exception. For example, if the ATR string is 24 bytes and the count parameter of the memcpy function is 36, the 24 byte ATR string and the 12 bytes of data stored after the ATR string will be copied into the buffer.

By copying the ATR string into a buffer of maximum size, smart card stub 401 can consistently specify the length of the ATR string for RPC purposes as the maximum ATR string size (e.g., 36 bytes) thereby eliminating the need for smart card stub 401 to parse the ATR string prior to invoking the RPC. Smart card stub 401 can then pass the buffer containing the ATR string to smart card proxy 402 via RPC. Even though the buffer containing the ATR string may also include irrelevant data at the end of the buffer, the operating system will still be able to correctly parse the ATR string when handling the API call. More particularly, since the operating system's parsing function will know the format of an ATR string, it will therefore be able to identify where the ATR string ends and will ignore any extra bytes that may be present in the buffer.

Figure 8:
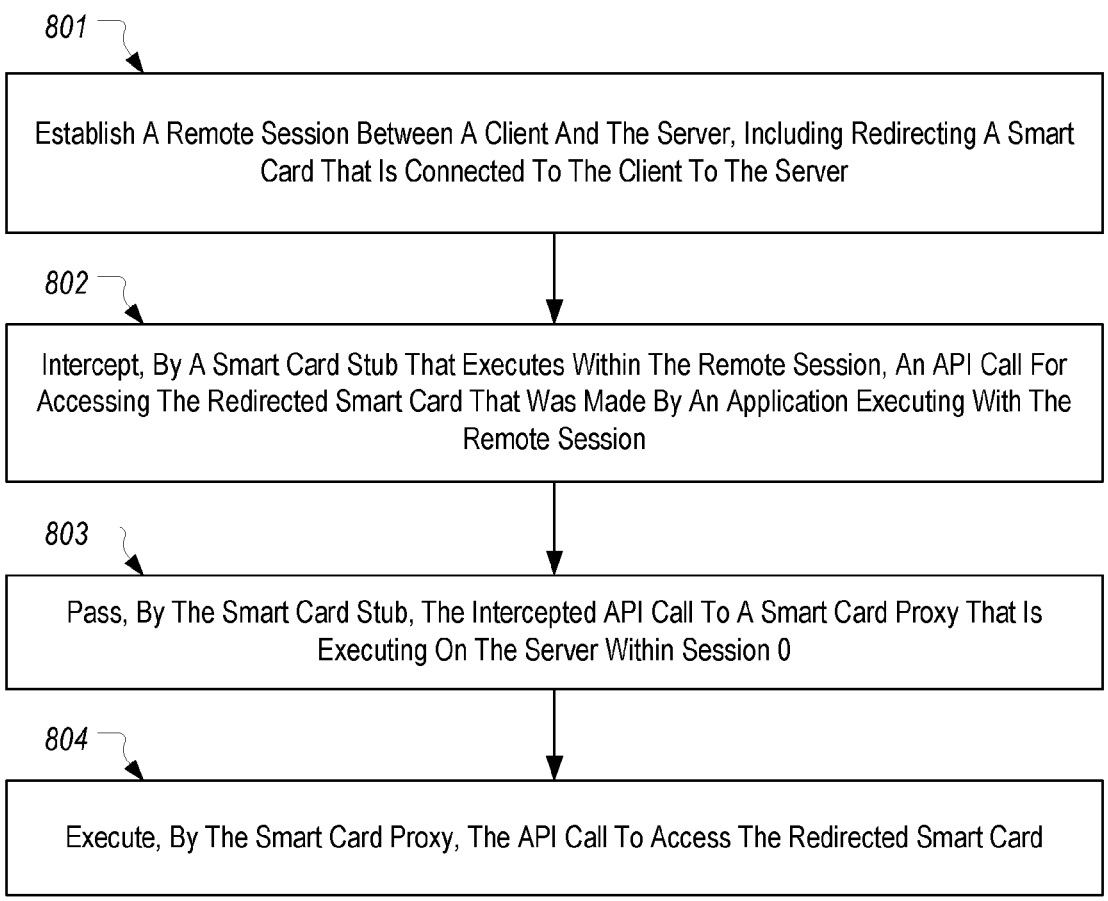
FIG. 8 is a flowchart of an example method for enabling access to a smart card from within a remote session.

FIG. 8 provides a flowchart of an example method 800 for enabling smart card access from within a remote session. Method 800 can be implemented by server 104 or any computing device that can accept remote connections.

Method 800 includes an act 801 of establishing a remote session between a client and the server, including redirecting a smart card that is connected to the client to the server. For example, client 102 can establish a remote session with server 104 and can redirect smart card 340 over the remote session.

Method 800 includes an act 802 of intercepting, by a smart card stub that executes within the remote session, an API call for accessing the redirected smart card that was made by an application executing with the remote session. For example, smart card stub 401 can intercept a smart card API call.

Method 800 includes an act 803 of passing, by the smart card stub, the intercepted API call to a smart card proxy that is executing on the server within session 0. For example, smart card stub 401 can pass the intercepted API call to smart card proxy 402.

Method 800 includes an act 804 of executing, by the smart card proxy, the API call to access the redirected smart card. For example smart card proxy 402 can execute an API call passed to it by smart card stub 401 so that resource manager 170c will allow the API call.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a server in a virtual desktop infrastructure environment, for enabling smart card access from within a remote session, the method comprising:
    establishing a remote session between a client and the server, including redirecting a smart card that is connected to the client to the server so that the smart card is accessible on the server;
    intercepting, by a smart card stub that executes within the remote session on the server, an application programming interface (API) for accessing the redirected smart card that was made by an application executing within the remote session;
    passing, by the smart card stub that executes within the remote session, the intercepted API call to a smart card proxy that is executing on the server within session 0; and
    executing, by the smart card proxy that executes within session 0, the API call to access the redirected smart card.

2. The method of claim 1, wherein the smart card stub passes the intercepted API call to the smart card proxy using a remote procedure call.

3. The method of claim 1, wherein the API call is executed via a smart card resource manager service that is executing on the server.

4. The method of claim 3, wherein the API call is executed via a smart card driver stack that is loaded on the server.

5. The method of claim 1, wherein the smart card stub employs a remote procedure call to pass the intercepted API call to the smart card proxy.

6. The method of claim 1, wherein the smart card stub hooks API calls of the WinSCard API.

7. The method of claim 1, further comprising:
    receiving, by the smart card proxy, a response from the execution of the API call; and
    passing the response to the smart card stub.

8. The method of claim 7, wherein the smart card proxy passes the response to the smart card stub as a response to a remote procedure call that the smart call stub invoked to pass the intercepted API call to the smart card proxy.

9. The method of claim 8, further comprising:
    returning, by the smart card stub, the response to the application.

10. The method of claim 1, wherein the intercepted API call includes an Answer-To-Reset (ATR) string, and the smart card stub passes the ATR string to the smart card proxy in a buffer having a size that is equal to the maximum size of an ATR string even when the ATR string has a size that is less than the maximum size.

11. The method of claim 10, wherein the smart card stub copies the ATR string into the buffer using the memcpy function that specifies the maximum size as the number of bytes to copy.

12. The method of claim 10, wherein the smart card stub passes the ATR string as part of a remote procedure call, including specifying the maximum size as the length of the ATR string.

13. The method of claim 1, further comprising:
    establishing a nested session with another server from within the remote session, including loading an instance of the smart card stub in the nested session;
    intercepting, by the smart card stub in the nested session, a second API call to access the smart card that is made by an application executing on the other server within the nested session;

passing, by the smart card stub in the nested session, the second intercepted API call to the smart card proxy executing on the server; and executing, by the smart card proxy, the second API call.

14. The method of claim 13, wherein the smart card stub in the nested session passes the second intercepted API call to the smart card proxy via a remote procedure call.

15. The method of claim 14, further comprising:
receiving, by the smart card proxy, a response to the second API call; and
passing the response to the second API call to the smart card stub in the nested session.

16. The method of claim 13, wherein establishing the nested sessions comprises specifying, to the smart card stub in the nested session, information for communicating with the smart card proxy.

17. One or more computer storage media having computer executable instructions which when executed by one or more processors of a server in a virtual desktop infrastructure environment implement a method for enabling smart card access from within a remote session, the method comprising:
as part of establishing a remote session for a client that has remotely connected to the server, loading a smart card stub in the remote session and a smart card proxy in session 0, loading the smart card stub including hooking operating-system-provided application programming interface (API) calls for accessing smart cards;
intercepting, by the smart card stub, an API call for accessing the redirected smart card that was made by an application executing with the remote session;
passing, by the smart card stub, the API call to the smart card proxy using a remote procedure call; and
executing, by the smart card proxy, the API call to access the redirected smart card.

18. The computer storage media of claim 17, wherein the API call includes an Answer to Reset (ATR) string, and wherein the smart card stub passes the ATR string in a buffer having a size equal to a maximum allowable size for an ATR string.

19. One or more computer storage media having computer executable instructions which when executed by one or more processors of a server implement a virtual desktop infrastructure environment comprising:
an agent that executes on the server and is configured to establish remote sessions with clients;
a virtual USB bus driver that interfaces with the agent to redirect smart cards from the clients to the server;
a smart card stub that is loaded in each remote session and is configured to intercept application programming interface (API) calls to access the redirected smart cards; and
a smart card proxy that is loaded in session 0 and is configured to receive the intercepted API calls from the smart card stub and to invoke the API calls.

20. The computer storage media of claim 19, wherein the smart card proxy receives the API calls via remote procedure calls.

* * * * *